United States Patent Office 3,560,487
Patented Feb. 2, 1971

3,560,487
17β-LACTONES OF 14β-HYDROXY-STEROIDS
AND PROCESS FOR PREPARING THEM
Hans Kohl, Schwalbach, Taunus, Werner Fritsch, Neuenhain, Taunus, Werner Haede, Hofheim, Taunus, Kurt Radscheit, Kelkheim, Taunus, and Ulrich Stache, Hofheim, Taunus, Germany, assignors to Farbwerke Hoechst Aktiengesellschaft vormals Meister, Lucius & Bruning, Frankfurt am Main, Germany
No Drawing. Filed Mar. 19, 1969, Ser. No. 808,689
Claims priority, application Germany, Apr. 27, 1968,
P 17 68 308.8
Int. Cl. C07c 173/02
U.S. Cl. 260—239.57
2 Claims

ABSTRACT OF THE DISCLOSURE

17β-lactones of 14β-hydroxy steroids are prepared by reacting carda-14,20(22)-dienolides or bufa-14,20,22-trienolides or the corresponding Δ⁴-derivatives with N-bromo acyl amides, the resulting 15α-bromo-14β-hydroxy derivatives are treated with Raney nickel in an organic solvent at room temperature and the 3-oxo groups are reduced with a metal hydride complex.

It is already known that 3,14β-dihydroxy-15-bromocard-20(22)-enolides can be converted by catalytic hydrogenation using noble metal catalysts in a hydrogen atmosphere into the corresponding 3,14β-dihydroxycard-20(22)-enolides. Furthermore, it is known (Ch. R. Engel and G. Bach "Steroids," vol. 3, page 593 (1964)) that 14β-hydroxy-card - 20(22) - enolides are obtained when treating 3β-hydroxy-5β-carda-14,20(22)-dienolides (Anhydrodigitoxigenin) with N - bromoacteamide chromatographing on aluminum oxide the crude 15-bromo-3β-14β-dihydroxy-5β-card-20(22)-enolide thus obtained, converting the 14,15β-oxido-card-20(22)-enolide thus formed into the 15α-chloro14β-hydroxy-card-20(22)-enolide by treatment with hydrochloric acid in chloroform and subsequently treating the product with Raney nickel in boiling ethanol. In this process, the yield is 4%; when re-using unused starting material the yield is 6.5%.

The present invention provides 17β-lactones of 14-hydroxy-steroids and a process for preparing them, which process is characterized by the carda-14,20(22)-dienolides or bufa-14,20,22-trienolides or corresponding Δ⁴-derivatives are reacted with N-bromo acyl amides to form the corresponding 15α-bromo-14β-hydroxy-derivatives, these derivatives are treated with Raney nickel in an organic solvent at room temperature and 3-oxo-groups are reduced with a metal hydride complex to form the corresponding 3α- or 3β-hydroxy- or 3β-hydroxy-Δ⁴-derivatives.

The process of the present invention proceeds, for example, according to the following scheme:

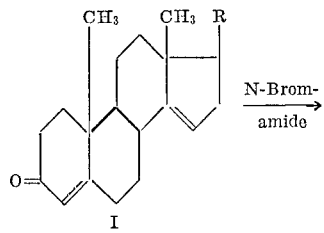

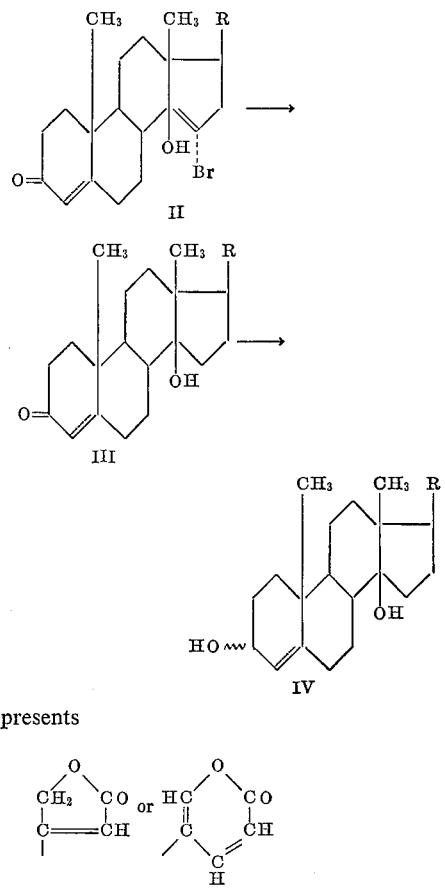

wherein R represents

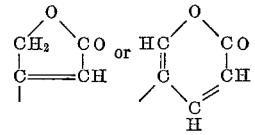

i.e. the cardenolide or the bufadienolide ring. In the above formula scheme, the starting substances (I) may also contain, in 3-position, instead of the oxo-group, an OH-group esterified with a low molecular acyl group in α- or β-position. If the steroid molecule is saturated in 4,5-position, the 3-OH-group is either in the α-position and the 5H-atom is in the β-position or the 3-OH-group is in the β-position and the 5H-atom is in the α-position or in the β-position; if the steroid molecule is unsaturated in 4,5-position, a 3-OH-group is always in the β-position.

As acyl group, the radical of a mono- or dicarboxylic acid having at most 6 carbon atoms is used. As acyl groups of mono-carboxylic acids, there may be used, for example the formyl, acetyl, propionyl or butyryl groups; as acyl groups of dicarboxylic acids, there may be mentioned, for example the acyl groups of malonic acid and of succinic acid.

The steroid compounds of Formula I used as starting substances may also carry further substituents which are inert towards N-bromamides, for example acyloxy or alkyl groups in 1-, 2-, 4-, 6-, 7-, 11-, 12-, 16-, 17- and/or 19-position.

The carda-14,20(22)-dienolides, especially the corresponding Δ⁴-3-oxo-derivatives, used as starting substances can be prepared, for example, by reacting 21-esters of 3,20 dioxo-21-hydroxy-5β-pregnanes or Δ⁴-pregnenes with hydrohalic or sulfonic acids, which may contain an additional sulfonic acid ester group or halogen atom in 15-position, with alkali salts of malonic acid semi-esters and treating the products obtained with tertiary organic bases or salts thereof. The bufa-14,20,22-trienolides used as starting substances, may be prepared, for example, by reacting corresponding 21-ketalized 20,21-diketo steroids with oxymethyl-triphenylphosphonium-halgenides according to Wittig, and subjecting the products obtained to ring closure.

The reaction to the corresponding bromohydrins can be carried out according to the method described by Engel and Bach in "Steroids," vol. 3, page 593, for example by treatment with N-bromoacetamide in dioxane in the presence of perchloric acid or by reaction with N-bromosulfonamides of preferably aromatic sulfonic acids such as, for example, N,N-dibromosulfonamide, in weakly acid solution, for example in the presence of acetic acid and in inert solvents such as ethers, for example dioxane, tetrahydrofurane or diglyme. Other N-bromamides in the presence or absence of perchloric acid and the mentioned solvents may also be used, for example N-bromosuccinimide. The reaction to the compounds of the Formula II is already known with 5β-saturated 3-hydroxycard-20(22)-enolides (cf. Belgian Patent 697,660). 3-oxo-carda-4,20(22)-dienolides and 3-hydroxy-5α-cardenolides and the corresponding bufadienolides have not yet been described.

The crude bromohydrins thus formed are subjected to treatment with Raney nickel without further purification. It is advisable to remove any excess of alkali from the Raney nickel by several short digestions with water. The major part of the water is then removed by washing two or three times with a lower alcohol such as methanol, ethanol or another water-miscible solvent inert towards Raney nickel. The catalyst may be further activated by passing a stream of hydrogen for some time through the stirred mixture. The hydrogen atmosphere above the Raney nickel suspension can then be replaced by nitrogen. This is favorable especially in the case of Δ$^4$-3-oxo-derivatives in order to prevent hydrogenation of the 4,5-double linkage. Part of the organic suspension agent used up to this point can be replaced by lower chlorohydrocarbons, for example chloroform or methylene chloride. The crude bromohydrin is dissolved at room temperature or at a temperature below room temperature, in a suitable organic solvent which is miscible with the solvent over the Raney nickel, for example chloroform or methylene chloride. If necessary, the solution is then washed with water until free from traces of acid and dried with a drying agent such as sodium sulfate or magnesium sulfate. The solution thus prepared is then added to the vigorously stirred Raney nickel suspension.

The reaction takes about 1 to 20, preferably about 3 hours. The temperature may be in the range of between 0 and 30° C., room temperature being preferred.

The quantity of Raney nickel used should be as large as possible, since undesired 14,15-oxido derivatives are formed in a more or less large quantity if lower amounts are used. Therefore, a 20- to 40-fold quantity of Raney nickel is used, based on the weight of steroid employed.

The process according to the present invention is very surprising. As is shown by Engel and Bach, the removal of the halogen by hydrogenation from steroids containing a cardenolide ring in the 17-position was possible only with the corresponding chlorohydrin and this only with a 13 and 25% yield. The chlorohydrins, however, must first be prepared from the corresponding bromohydrins via the respective oxido derivatives. In that case, the removal of the chlorine atom by hydrogenation was effected by means of Raney nickel in boiling methanol or acetone, after having first deactivated the Raney nickel with acetic acid. In contradistinction thereto, the yields in the process of the present invention amount, in the case of the cardenolides, to about 30–70% (compared to 4–7.5% of the state of the art), referred to Δ$^{14}$-derivative initially used, and it is possible to use directly the 15α-bromo - compounds. This reaction which is much simpler and also gives better yields was not foreseeable and offers great advantages over the known reaction. Halogeno-hydrins of bufadienolides have hitherto not been used for the synthesis of 14β-hydroxy-bufadienolides. Furthermore, it is surprising that in the 3-oxo-Δ$^4$-cardenolides and -bufadienolides the 4,5-double linkage is not attacked under the reaction conditions. The 3-oxo-14β-hydroxy-Δ$^4$-cardenolides obtained by the reaction can be easily reduced, as already known (Kuno Meyer et al., Helv. chim. Acta. Vol. 46, (1963), page 23) by means of complex metal hydrides, to the corresponding 3-hydroxy-Δ$^4$-cardenolides, which have a strong cardiac activity for example to canarigenin. For this purpose lithium-aluminum-tri-tert.butoxy-hydride in suitable solvents, for example ethers such as tetrahydrofurane is preferably used, preferably at temperatures around 0° C.

The corresponding reaction of 3-oxo-bufa-4,20,22-trienolides to 3β-hydroxy-bufa-4,20,22-trienolides has not yet been described. It can be effected successfully under the above conditions when using a prolonged reaction time because the 3-oxo-Δ$^4$-compound is more slowly reduced than the saturated 3-oxo-compound.

The reduction of the 3-oxo-bufa-4,20,22-trienolides leads to compounds of the scillarenin type having a high cardiac activity, for example scillarenin. With respect to cardiac activity, the 3β-hydroxy-Δ$^4$-group, which is easily accessible by the process of the present invention, is equivalent to the 3β-hydroxy-5β-group (for example of the digitoxigenin series) which is, however, less easily accessible (by a partially synthetic method). The products of the saturated series also have valuable pharmacological properties. In particular they possess a positive inotropic cardiovascular action. The products of the present invention may also be used as intermediate products for the manufacture of medicaments.

The following examples illustrate the invention but they are not intended to limit it thereto:

EXAMPLE 1

(a) 14β-hydroxy-3-oxo-carda-4,20(22)-dienolide (anhydroperiplogenin)

2.06 g. of 3-oxo-carda-4,14,20(22) - trienolide were suspended in 21 ml. of dioxane (free from peroxide) and then combined, under exclusion of light, at a temperature of 15° C. and while stirring, with 3.4 ml. of 0.39 N perchloric acid. Then 1.3 g. (1.6 molar equivalents) of N-bromoacetamide were introduced in small portions within 30 minutes, after which a clear solution formed. The whole was stirred for one hour at 15–18° C., and then cooled in an ice bath for about 3 minutes. The reaction mixture was then stirred into 220 ml. of ice-cold water. After stirring for 5 minutes, the 14β-hydroxy-15α-bromo-derivative that precipitated was filtered off with suction, washed with water; the filter residue was dissolved in methylene chloride (about 150 ml., at the end of the operation there should be after washing and rinsing a total of 250 ml. of solution). The methylene chloride extract was washed once with water in order to remove any residual mineral acid, dried over sodium sulfate and separated from the latter by filtration. In the meantime the catalyst was prepared as follows: 75 g. of water-wet Raney nickel were shaken with 750 ml. of water for some seconds, the Raney nickel was allowed to settle, the supernatant water was decanted and the process repeated twice. The same procedure was repeated, likewise three times, with each time 100 ml. of methanol. Thus, there were obtained 95 g. of a methanol-wet Raney nickel sludge which had a volume of about 55 ml., corresponding approximately to 40 g. of dry Raney nickel. This suspension was rinsed with 300 ml. of methanol into a vessel fitted with a stirrer and filled with nitrogen. Then, hydrogen was passed through for 1½ hours while well stirring. Stirring was discontinued, nitrogen was passed through the reaction vessel, the supernatant methanol was siphoned off and finally, after addition of 75 ml. of pure methylene chloride, the whole was again stirred for some seconds. After removal of the supernatant methylene chloride by siphoning, the catalyst was ready and had to be used as soon as possible.

The solution of the crude bromohydrin was poured rapidly under vigorous stirring into 250 ml. of methylene chloride. The progress of the hydrogenolysis was determined by thin-layer chromatography. The thin-layer chromatogram showed that after about 22½ hours stirring at room temperature (22–23° C.) no starting material was any longer present. The 14,15-oxido derivative which is somewhat more polar showed only slightly in the chromatogram.

After 3 hours stirring, the Raney nickel was suction-filtered and the filter residue was well washed with methylene chloride which contained 1–2% of methanol. The filtrate was washed with water, dried over sodium sulfate and concentrated to dryness under reduced pressure.

The residue was shortly boiled in about 5–7 ml. of methanol; upon cooling, 40 mg. of 14,15-oxido-3-oxo-carda-4,20(22)-dienolide crystallized, which was very sparingly soluble in cold methanol. The filtrate was again concentrated to dryness and the residue recrystallized from acetone. In this manner 1.1 g. of 14β-hydroxy-3-oxo-carda-4,20(22)-dienolide were obtained. Melting point: 233–242° C.; $[\alpha]_D^{23} = +96 \pm 2°$ (c.=1, in chloroform). The mother liquors were concentrated to dryness under reduced pressure and chromatographed on a column of 25 g. of aluminum hydroxide (Woelm), neutral activity degree II. With methylene chloride, a further 310 mg. of the same compound were thus obtained.

(b) 3β,14β-dihydroxy-carda-4,20(22)-dienolide (canarigenin)

480 mg. of 14β-hydroxy-3-oxo-carda-4,20(22)-dienolide were dissolved in 28 ml. of hot isopropanol. After cooling to room temperature 12 ml. of a saturated sodium-boron hydride solution in isopropanol were added. The mixture was left at room temperature for 15 hours, then a mixture of 0.3 ml. of glacial acetic acid and 0.5 ml. of water were added dropwise under cooling and stirring. The reaction mixture should have a neutral, at most a weakly basic pH. The reaction mixture was then concentrated to dryness in a rotatory evaporator and triturated with cold methylene chloride, and the methylene chloride extract was washed immediately with dilute sodium bicarbonate solution to neutrality. After drying over sodium sulfate, the solution was concentrated to dryness under reduced pressure. After recrystallization from a small amount of acetone/ether and repeated recrystallization from pure acetone, 235 mg. of 3β,14β-dihydroxy-carda-4,20(22)-dienolide melting at 245–257° C. (Kofler block) were obtained. The mother liquor was concentrated to dryness and chromatographed on a column charged with 8.5 g. of aluminum oxide (Woelm), activity degree II, neutral. The eluates with pure methylene chloride yielded another 70 mg. of canarigenin.

EXAMPLE 2

(a) 14β-hydroxy-3-oxo-bufa-4,20,22-trienolide (Scillarenone)

To 2.14 g. of 3-oxo-bufa-4,14,20,22-tetraenolide (14-anhydroscillarenone) in 20 ml. of dioxane 3.4 ml. of 0.39 N perchloric acid were added at 15° C. while stirring under exclusion of light. Immediately thereafter, 1.22 g. (1.5 molar equivalents) of N-bromo-acetamide were added in small portions within 30 minutes. After stirring for 1 hour at 15° C., the reaction mixture was stirred into 300 ml. of an ice-cold saturated NaCl-solution.

The reaction mixture was extracted three times with 100 ml. of methylene chloride each and the combined organic extracts were washed with small amounts of ice-cooled saturated NaCl-solution until neutral. After drying over sodium sulfate, the methylene chloride extract was concentrated immediately, under reduced pressure, to 150 ml. and added to 95 g. of methanol-wet Raney nickel that had been prepared as described in Example 1. After 5 hours of slow stirring at 20° C., the catalyst was suction-filtered and washed with methylene chloride. After washing with water, the combined filtrates were dried over sodium sulfate. The residue obtained upon concentration under reduced pressure was recrystallized from a mixture of acetone and a small amount of methanol. 705 mg. of 14β-hydroxy-3-oxo-bufa-4,20,22-trienolide melting at 248–250° C. were obtained.

(b) 3β,14β-dihydroxy-bufa-4,20,22-trienolide (scillarenin)

150 mg. of scillarenone were dissolved in 15 ml. of absolute tetrahydrofurane. After cooling to −5° C., 4.8 ml. of a solution of lithium-aluminum-tri-tert.butoxyhydride in absolute tetrahydrofurane (1 ml. containing 220 mg. of the complex metal hydride) were added dropwise, while stirring well. Stirring was continued for 1½ hour at −5° C., then for another 70 minutes at −1° C. A mixture of 10 ml. of tetrahydrofurane, 0.3 g. of glacial acetic acid and 5 ml. of water was then added dropwise, with vigorous stirring, to the reaction mixture whereby the internal temperature was kept at 0° C. After stirring for 45 minutes, the temperature of the reaction mixture slowly rising to room temperature, working up was effected as follows: the reaction mixture was neutralized, then concentrated to dryness in a rotatory evaporator and the residue was well triturated with a large quantity of cold methylene chloride. Undissolved inorganic compounds were separated by filtration with suction and the filter residue was washed several times with methylene chloride and chloroform. The combined organic filtrates, if they still showed an acid reaction, were immediately washed with dilute sodium bicarbonate solution until neutrality. After drying over sodium sulfate, the filtrates were concentrated to dryness under reduced pressure. After digestion of the residue with a small amount of ether, 90 mg. of scillarenin melting at 231–239° C. (Kofler block) were obtained.

EXAMPLE 3

3α-acetoxy-14β-hydroxy-5β-card-20(22)-enolide (3-epi-digitoxigeninacetate)

1.03 g. of 3α-acetoxy-5β-carda-14,20(22)-dienolide was suspended in 10.5 ml. of peroxide-free dioxane and a mixture of 1.7 ml. of 0.39 N perchloric acid and 0.65 g. of N bromoacetamide was added as described in Example 1a. The whole was subsequently stirred for 1 hour at 15–18° C., and poured into 110 ml. of ice-cold water while stirring. Stirring was continued for 5 minutes. The bromohydrin that precipitated was then separated by filtration, washed with water, and the filter residue was dissolved in methylene chloride. The extract was washed with water, dried over sodium sulfate, and concentrated to dryness under reduced pressure at room temperature. The residue was dissolved in 125 ml. of methylene chloride and added to a suspension as described in Example 1a and prepared from 37.5 g. of wet Raney nickel and a small amount of methanol and methylene chloride. After stirring for 4 hours at 20° C., the catalyst was removed by filtration with suction and washed with a large quantity of methylene chloride. The filtrate was washed with a small amount of water, dried over sodium sulfate and concentrated to dryness under reduced pressure. The residue of the distillation was brought to crystallization by trituration with a small amount of ether containing a few drops of acetone, if necessary after inoculating with authentic material. 420 mg. of 3-epi-digitoxigeninacetate melting at 210–212° C. (Kofler block) were obtained.

EXAMPLE 4

3β-formoxy-14β-hydroxy-5β-card-20(22)-enolide (digitoxigenin-formate)

To a stirred and cooled solution of 480 mg. of 3β-formoxy-5β-carda-14,20(22)-dienolide in 16 ml. of dioxane, a mixture of 0.344 ml. of glacial acetic acid and 2.87 ml. of water was added. Then, 196 mg. of freshly recrystallized N,N-dibromo-benzene-sulfonamide were introduced into the well stirred mixture. Stirring and cooling was continued for 1 hour, then 30 ml. of ice-water were added. The precipitate that formed was removed by filtration, washed with water and dissolved in about 20 ml. of methylene chloride. The solution was washed with water, dried over sodium sulfate and filled up to a total volume of 24 ml. It then was poured into a stirred suspension of Raney nickel catalyst prepared as described in Example 3 and containing 19.5 g. of wet Raney nickel. The mixture was stirred for 3½ hours at 26° C. and then worked up as described. The methylene chloride filtrates and extracts were washed with water, dried and concentrated to dryness under reduced pressure. For further purification, the crude digitoxigenin-formate thus obtained was dissolved in a small amount of benzene and chromotographed on a column consisting of 3.75 g. of alumium oxide (Woelm) neutral, activity degree II. After elution with benzene and recrystallization from a mixture of a small amount of ether and acetone, 225 mg. of digitoxigenin-formate melting at 204–206° C. (Kofler block) were obtained.

EXAMPLE 5

3β-acetoxy-14β-hydroxy-5α-card-20(22)-enolide (uzarigenin-acetate)

260 mg. of N,N-dibromo-benzenesulfonic acid amide were introduced portionwise, while stirring, at about 5° C., into a solution of 670 mg. of 3β-acetoxy-5α-carda-14,20(22)-dienolide in 23 ml. of dioxane, 0.44 ml. of glacial acetic acid and 3.7 ml. of water. The resulting solution was allowed to stand for 3 hours at 20° C. and then poured into 100 ml. of semi-saturated NaCl-solution while stirring. The crude precipitate of 3β-acetoxy-15α-bromo-14β-hydroxy-5α-card - 20(22) - enolide was filtered off, washed with a small amount of water and dissolved in 25 ml. of methylene chloride. This solution was again washed with water, dried over sodium sulfate and added dropwise and rapidly to a vigourously stirred suspension prepared from 27 g. of water-wet Raney nickel in a small quantity of methanol and methylene chloride as described in the preceding examples. After 3 hours the catalyst was removed by filtration with suction and washed with methylene chloride. The combined filtrates were washed with water, dried and concentrated to dryness under reduced pressure. The residue was brought to crystallization by rubbing with a small amount of ether to which some drops of acetone had been added. After repeated recrystallization from methylene chloride/ether, 295 mg. of uzarigenin-acetate melting at 216–218° C. were obtained.

What we claim is:

1. A process for the manufacture of $\Delta^4$-14β-hydroxy-17β-steroidal lactones which comprises reacting a carda-$\Delta^{4,14,20}$-trienolide or a bufa-$\Delta^{4,14,20,22}$-tetraenolide with an N-bromo acyl amide to form the corresponding 15α-bromo-14β-hydroxy derivative, and treating the 15α-bromo derivative with Raney nickel in an organic solvent at room temperature.

2. A process as in claim 1 wherein any 3-oxo-groups present are reduced with a metal hydride complex to form the corresponding 3β,14β-dihydroxy-17β-steroidal lactone.

References Cited

UNITED STATES PATENTS 3,080,362   3/1963   Tamm _____ 260—239.57

FOREIGN PATENTS 1,521,087   3/1968   France _____ 260—239.57

LEWIS GOTTS, Primary Examiner

E. G. LOVE, Assistant Examiner